（12）United States Patent
Lee et al.

(10) Patent No.: US 7,455,820 B2
(45) Date of Patent: Nov. 25, 2008

(54) PROCESS FOR REMOVING SULFUR DIOXIDE AND NITROGEN OXIDES FROM FLUE GAS USING CHLORINE DIOXIDE

(75) Inventors: Hyung-Keun Lee, Daejeon (KR); Won-Kil Choi, Daejeon (KR); Hang-Dae Jo, Daejeon (KR); Dong-Seop Jin, Daejeon (KR); Bal Raj Deshwal, Haryana (IN)

(73) Assignee: Korea Institute of Energy Research (KR)

( * ) Notice: Subject to any disclaimer, the term of this patent is extended or adjusted under 35 U.S.C. 154(b) by 380 days.

(21) Appl. No.: 11/323,298

(22) Filed: Dec. 30, 2005

(65) Prior Publication Data

US 2006/0239878 A1 Oct. 26, 2006

(30) Foreign Application Priority Data

Apr. 25, 2005 (KR) .................. 10-2005-0034119

(51) Int. Cl.
*B01D 53/60* (2006.01)
(52) U.S. Cl. ................ 423/235; 423/242.1; 423/243.01
(58) Field of Classification Search ................ 423/235, 423/242.1, 243.01
See application file for complete search history.

(56) References Cited

U.S. PATENT DOCUMENTS

| 3,867,509 | A | * | 2/1975 | Geiger et al. ............... 423/224 |
| 3,962,112 | A | * | 6/1976 | Shaheen ................. 252/187.21 |
| 4,035,470 | A | * | 7/1977 | Senjo et al. ................. 423/235 |
| 4,968,501 | A | * | 11/1990 | Mason ..................... 423/242.3 |
| 5,328,673 | A | * | 7/1994 | Kaczur et al. ............... 423/235 |
| 2004/0005262 | A1 | * | 1/2004 | Takacs et al. ............... 423/235 |
| 2006/0233688 | A1 | * | 10/2006 | Barckholtz et al. .......... 423/235 |
| 2007/0128090 | A1 | * | 6/2007 | Ray et al. .............. 422/186.03 |

* cited by examiner

*Primary Examiner*—Timothy C Vanoy
(74) *Attorney, Agent, or Firm*—Fish & Richardson P.C.

(57) ABSTRACT

Disclosed herein is a process for removing sulfur dioxide ($SO_2$) and nitrogen oxides ($NO_x$) from flue gas using chlorine dioxide ($ClO_2$). In the process, chlorine dioxide is allowed to react with flue gas in an alkaline solution so as to be able to simultaneously remove sulfur dioxide and nitrogen oxides from the flue gas. In the simultaneous removal of sulfur dioxide and nitrogen oxides from flue gas using the process, chlorine dioxide is produced by side reactions, and the produced chlorine dioxide can be used to remove sulfur dioxide and nitrogen oxides from flue gas.

16 Claims, 3 Drawing Sheets

PROCESS FOR REMOVING SULFUR DIOXIDE AND NITROGEN OXIDES FROM FLUE GAS USING CHLORINE DIOXIDE

BACKGROUND OF THE INVENTION

1. Field of the Invention

The present invention relates to a process for removing sulfur dioxide ($SO_2$) and nitrogen oxides ($NO_x$) from flue gas using chlorine dioxide ($ClO_2$), and more particularly, to a process for removing sulfur dioxide and nitrogen oxides from flue gas, in which chlorine dioxide is allowed to react with flue gas in an alkaline solution so as to simultaneously remove sulfur dioxide and nitrogen oxides from the flue gas.

2. Description of the Prior Art

Flue gas exhausted from the combustion of fossil fuels, such as petroleum and coal, contains various components, typical pollutants of which include sulfur dioxide and nitrogen oxides.

Such sulfur dioxide and nitrogen dioxides pollute the atmosphere, and rain containing such pollutants becomes so-called "acid rain" which is the main cause of soil and river pollution.

Thus, flue gas from the combustion of fossil fuels should emit pollutants in amounts lower than those specified in regulations. For this reason, many studies on systems and/or processes for removing sulfur dioxide and nitrogen oxides from flue gas are being conducted.

To evaluate effects on the removal of nitrogen oxides ($NO_x$) from flue gas, studies on various inorganic oxidizing agents and inorganic oxidizing agents have been conducted.

Among studied oxidizing agents, additives applicable in a vapor phase include ozone, chlorine dioxide, sulfur phosphorus and oxygen, and additives applicable in a liquid phase include $KMnO_4$, $NaClO_2$, $H_2O_2$ and ferrous chelate compounds.

Generally, the additive is added into an absorption scrubber so as to oxidize nitrogen oxide (NO) into nitrogen dioxide ($NO_2$) which is relatively easy to treat. The nitrogen dioxide is removed by absorption into an alkaline solution.

Several technologies relating to processes of using the oxidizing agent in this wet process to oxidize nitrogen oxide (NO) into nitrogen dioxide ($NO_2$) and treating the nitrogen dioxide are known in the art.

Meanwhile, technologies for treating sulfur dioxide ($SO_2$) and nitrogen oxides ($NO_x$) contained in flue gas are widely known, but there is still no economically successful technology.

The main reasons for this are that additives usable for the removal of $NO_x$ are chemically unsuitable for the removal of $SO_2$ and that the optimum conditions for the action of one of the additives or absorbing agents for $NO_x$ and $SO_2$ are not the optimum conditions for the other, even if there is no substantial interference therebetween.

Such phenomena can be seen in the limited conditions for Fe(II) chelate compounds and sulfites disclosed in several patents.

Up to now, among chemical substances related with the absorption of nitrogen oxide (NO), sodium chlorite was identified to be the most efficient oxidizing agent, but it has a problem in that it shows optimum action only in weakly acidic conditions.

Namely, sodium chlorite shows excellent oxidizing power in an acidic atmosphere with low pH and has excellent absorbing powder in a basic atmosphere with high pH. Thus, pH becomes a critical factor in absorbing $NO_2$ resulting from the oxidation of NO.

Also, the sodium chlorite is a very expensive chemical substance because it is prepared by the reduction of chlorine dioxide as shown in the following reaction formula (1):

$$2ClO_2 + H_2O_2 + 2NaOH \rightarrow 2NaClO_2 + O_2 + H_2O \tag{1}$$

In view of this point, the direct use of chlorine dioxide gas in oxidizing NO is considered to be more reasonable because it can solve not only the problem of cost but also the problem of pH adjustment. Thus, the present invention comprises introducing chlorine dioxide gas into a scrubbing liquid so as to simultaneously treat $NO_x$ and $SO_2$ contained in flue gas.

Chlorine dioxide, used in the present invention to remove sulfur dioxide and nitrogen oxides from flue gas, is a neutral component which is promising as a powerful oxidizing agent and sterilizing/disinfecting agent, and recently, its commercial utility has been acknowledged in a wide range of applications, such as bleaching, oxidation and sterilization/disinfection, as have its environmental benefits.

Although chlorine dioxide is well known as a powerful oxidizing agent capable of oxidizing NO into $NO_2$ in vapor and liquid phases, an effort to use chlorine dioxide to simultaneously treat $SO_2$ and NO contained in flue gas has not yet been made. Thus, there is now an urgent need for the technology for using chlorine dioxide to treat industrial flue gases.

Methods of preparing chloride dioxide have been reported in a wide range of literature, including a plurality of patents. Chlorine dioxide is generally prepared in situ and used immediately, because it has risk factors due to its instability and rapid decomposition.

Chlorine dioxide is prepared from an acidic solution of $NaClO_2$ or $NaClO_3$, and medium and small-scale $ClO_2$ generators mostly utilize $NaClO_2$ as a raw material. When a large amount of chlorine dioxide is required, $NaClO_3$ is then used.

Chlorine dioxide can be produced either by the oxidation of chlorite as shown in the following reaction formula (2) or the reduction of chlorate with various organic or inorganic substances in a relatively concentrated acidic solution as shown in the following reaction formula (3):

$$ClO_2^- \rightarrow ClO_2 + e^- \tag{2}$$

$$ClO_3^- + 2H^+ + e^- \rightarrow ClO_2 + H_2O \tag{3}$$

The selection of the reducing agent has a great effect on the optimum reaction condition, by-products and process economy.

The process of preparing $ClO_2$ from $NaClO_2$ is easier to control than the process of preparing $ClO_2$ from $NaClO_3$, but this process is uneconomic.

In fact, the reaction formula (2) is reversible, and chlorite may be synthesized from $ClO_2$. Thus, from an industrial point of view, $NaClO_3$ is considered to the most suitable raw material for preparing $ClO_2$.

SUMMARY OF THE INVENTION

Accordingly, it is an object of the present invention to provide a process for removing sulfur dioxide and nitrogen oxides from flue gas, in which chlorine dioxide is allowed to react with flue gas in an alkaline solution so as to be able to simultaneously remove sulfur dioxide and nitrogen oxides from the flue gas.

In the simultaneous removal of sulfur dioxide and nitrogen oxides from fuel gases according to the present invention, chlorine dioxide is produced by side reactions. The produced chlorine dioxide can be used to remove sulfur dioxide and nitrogen oxides from flue gas according to the present invention.

To achieve the above object, the present invention provides a process for removing sulfur dioxide and nitrogen oxides from flue gases, in which chlorine dioxide is allowed to react with flue gas in an alkaline solution so as to simultaneously remove sulfur dioxide and nitrogen oxides from the flue gas.

DETAILED DESCRIPTION OF THE INVENTION

Figure 1:
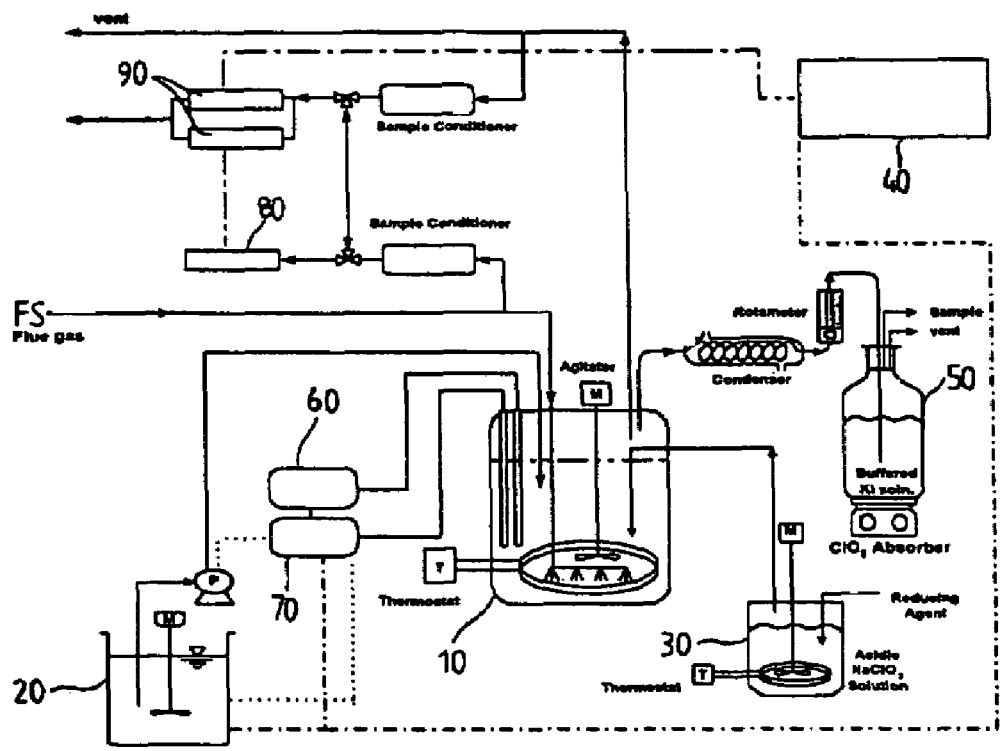
FIG. 1 shows an example of a system for removing sulfur dioxide and nitrogen oxides from flue gas using chlorine dioxide according to the present invention.

Hereinafter, the present invention will be described in detail.

In the present invention, sulfur dioxide ($SO_2$) and nitrogen oxide ($NO_x$) in flue gas can be removed from the flue gases by a method of supplying a suitable flow rate of $ClO_2$ into a reaction solution within a single reactor.

In removing sulfur dioxide and nitrogen oxides from flue gas according to the present invention, $ClO_2$ gas supplied and dissolved in a reaction solution oxidizes NO in flue gas to $NO_2$ as shown in the following reaction formula (4), and the $NO_2$ reacts again with $ClO_2$ as shown in the following equation formula (5) so that is absorbed into the reaction solution while producing nitrate:

$$5NO + 2ClO_2 + H_2O \rightarrow 5NO_2 + 2HCl \text{ (oxidation)} \quad (4)$$

$$5NO_2 + ClO_2 + 3H_2O \rightarrow 5HNO_3 + HCl \text{ (absorption)} \quad (5)$$

Meanwhile, in removing sulfur dioxide and nitrogen oxides from flue gas according to the present invention, sulfur dioxide in flue gas reacts with $ClO_2$, supplied and dissolved in the reaction solution, to produce sulfite, as shown in the following reaction formula (6). In this way, sulfur dioxide in flue gas is removed from the flue gas.

The removal of sulfur dioxide from flue gas by the reaction as shown in the reaction formula (6) proceeds simultaneously with the removal of nitrogen oxides as shown in the reaction formulas (4) and (5):

$$M(OH)_x + SO_2 \rightarrow M_xSO_3 + H_2O \quad (6)$$

In the reaction formula (6), M represents the alkali metal or alkaline earth metal of alkali metal hydroxide or alkaline metal hydroxide, a reaction solution, and x represents the valency of the alkali metal or the alkaline earth metal.

$SO_2$ in flue gas is first absorbed into a reaction solution of alkali metal hydroxide or alkaline earth metal hydroxide so as to produce sulfite which is then used to remove $NO_2$ as shown in the following reaction formula (7) while producing sulfate. Also, some of the sulfite is oxidized to sulfate by dissolved oxygen and $ClO_2$ as shown in the following reaction formulas (8) and (9):

$$2NO_2 + 4MxSO_3 \rightarrow N_2 + 4MxSO_4 \quad (7)$$

$$2MxSO_3 + O_2 \rightarrow 2MxSO_4 \quad (8)$$

$$5MxSO_3 + 2ClO_2 + H_2O \rightarrow 2HCl + 5MxSO_4 \quad (9)$$

In the reaction formulas (7) to (9), M and x have the same meanings as defined above.

As the reaction solution where chlorine dioxide and flue gas react with each other according to the present invention, an alkaline solution may be used, and an example of this alkaline solution may be an alkali metal or alkaline earth metal compound.

The alkali metal compound which can be used in the present invention may be at least one selected from the group consisting of sodium hydroxide, sodium sulfite and sodium bicarbonate.

The alkaline earth metal compound which can be used in the present invention may be at least one selected from the group consisting of calcium carbonate, calcium hydroxide and magnesium hydroxide.

Chlorine dioxide used to remove sulfur dioxide and nitrogen oxides from flue gas according to the present invention can be obtained by reducing chlorate with a reducing agent.

Any reducing agent can be used in the present invention if it allows chlorine dioxide to be obtained from the chlorate.

This reducing agent used in the present invention may be any one selected from the group consisting of sulfur dioxide ($SO_2$), methanol ($CH_3OH$), chlorine ion ($Cl^-$), and hydrogen peroxide ($H_2O_2$).

The selection of the reducing agent has a great effect on the optimum reaction condition, by-products and process economy, and the overall reaction stoichiometry in the use of the reducing agent can be represented by the following reaction formulas (10) to (13):

$$2ClO_3^- + SO_2 \rightarrow 2ClO_2 + SO_4^{-2} \quad (10)$$

$$4ClO_3^- + CH_3OH + 4H^+ \rightarrow 4ClO_2 + HCOOH + 3H_2O \quad (11)$$

$$2ClO_3^- + 4H^+ + 2Cl^- \rightarrow 2ClO_2 + Cl_2 + 2H_2O \quad (12)$$

$$2ClO_3^- + H_2O_2 + 2H^+ \rightarrow ClO_2 + O_2 + H_2O \quad (13)$$

By-products produced by the reactions as shown in the reaction formulas (10)-(13) are $SO_4^{-2}$, HCOOH, $Cl_2$, and $O_2$, respectively. In the overall process, side reactions can occur, and as a result, chlorine ion ($Cl^-$) can be produced by a reaction as shown in the following reaction formula (14):

$$ClO_3^- + 6H^+ + 6e^- \rightarrow Cl^- + 3H_2O \quad (14)$$

In all processes based on chlorate ($ClO_3^-$), chlorine ion plays a critical role. Namely, if the chlorine ion is not present in reactants, the production of $ClO_2$ will not occur. The chlorine ion participates in reactions either by being added to raw materials or by being produced during a process where chlorate is reduced into chlorite as shown in the reaction formula (14).

By using chlorine dioxide as shown in the reaction formulas (4)-(7), the present invention allows $SO_x$ and $NO_x$ to be discharged from exhaust gas, such as flue gas, at lower concentrations than permissible discharge standards for $SO_x$ and $NO_x$.

Meanwhile, in the present invention, the concentration of chlorine dioxide supplied into the reaction solution can be adjusted by the supplying rate of the reducing agent in the preparation of chlorine dioxide.

In the present invention, chlorine dioxide can be supplied into the reaction solution by a carrier gas. The carrier gas used in the present invention may be any one selected from the group consisting of, for example, air, nitrogen, and flue gas.

Chlorine dioxide can be supplied into the reaction solution by a carrier gas so as to react with sulfur dioxide and nitrogen oxides contained in a flue gas supplied into the reaction solution, thus removing sulfur dioxide and nitrogen oxides from the flue gas. For example, chlorine dioxide can be supplied into the reaction solution within a closed reactor with a total volume of 2.5 liters by a carrier gas with a flow rate of 2-10 liters/min per liter of the reaction solution, so as to react with sulfur dioxide and nitrogen oxides contained in a flue gas supplied into the reaction solution, thus removing sulfur dioxide and nitrogen oxides from the flue gas.

In the present invention, chlorine dioxide was supplied into the reaction solution by a carrier gas with various flow rates so as to react with flue gas, and the results showed that the supply of chlorine dioxide by a carrier gas with a flow rate within the above-specified flow rate range is suitable for removing sulfur dioxide and nitrogen oxides from flue gas.

The use of flue gas itself as a carrier gas is advantageous in that $SO_2$ or NO contained in the flue gas itself helps the generation of $ClO_2$ as shown in the following reaction equation:

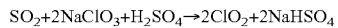

$$SO_2 + 2NaClO_3 + H_2SO_4 \rightarrow 2ClO_2 + 2NaHSO_4$$

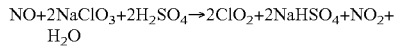

$$NO + 2NaClO_3 + 2H_2SO_4 \rightarrow 2ClO_2 + 2NaHSO_4 + NO_2 + H_2O$$

In the present invention, the reaction of chlorine dioxide with flue gas in the reaction solution can be carried out at a temperature of 20-60° C.

If the reaction temperature is less than 20° C., the reaction efficiency between chlorine dioxide and flue gas will be insufficient, and if the reaction temperature is more than 60° C., the cost for temperature rise will be unnecessarily incurred without a distinct increase in an effect on the reaction efficiency between chlorine dioxide and flue gas.

For this reason, in the present invention, the reaction between chlorine dioxide and flue gas in the reaction solution is preferably carried out at a temperature of 20-60° C.

In the present invention, the pH of the reaction solution where chlorine dioxide and flue gas react with each other can be maintained in a range of 3-11. When the pH of the reaction solution is increased by the production of an acidic substance as a result of the reaction of chlorine dioxide with flue gas in the reaction solution, alkali metal hydroxide or alkaline earth metal hydroxide can be added to the reaction solution so as to maintain the pH of the reaction solution in a range of 3-11.

Flue gas that reacts with chlorine dioxide in the reaction solution may contain 4-10 wt % of oxygen.

According to the present invention, flue gas containing 200-700 ppm of sulfur dioxide and 150-1,000 ppm of nitrogen oxides is allowed to react with chlorine dioxide so as to remove sulfur dioxide and nitrogen oxides from the flue gas.

Hereinafter, the present invention will be described in more detail by examples and test examples. However, these examples are given to more fully describe the present invention, but are not construed to limit the scope of the present invention.

EXAMPLE 1

Hereinafter, a process of removing NO from flue gas using $ClO_2$ will be described in more detail with reference to the accompanying drawings.

FIG. 1 is an example of a system for removing sulfur dioxide and nitrogen oxides from flue gas using chlorine dioxide according to the present invention. As shown in FIG. 1, the system comprises a bubbling reactor 10, a container 20 containing alkali metal hydroxide, and a chlorine dioxide generator 30 for producing chlorine dioxide by reducing chlorate with a reducing agent.

The bubbling reactor 10 contains a reaction solution of sodium hydroxide (NaOH), an alkali metal hydroxide.

Into the reaction solution within the bubbling reactor 10, flue gas (FS) is supplied, and chlorine dioxide in the chlorine dioxide generator 30 is supplied into the reaction solution within the bubbling reactor 10. Then, the flue gas and the chlorine dioxide react with each other so as to remove nitrogen oxides from the flue gas.

Continuous stirring within the bubbling reactor is conducted with a mechanical stirrer at 250 rpm, and the temperature within the reactor is adjusted to 45° C. with a heated water circulator.

Meanwhile, as flue gas and chlorine dioxide in the reaction solution react with each other, the amount of acidic substance in the reaction solution increases so that the pH of the reaction solution falls below 3.5. In this case, the pH controller (KFC-MK-250) 70 detects this decrease in pH, and sodium hydroxide 20, an alkali metal hydroxide, is introduced into the bubbling reactor 10 by the peristaltic pump (P) so that the pH of the reaction solution within the bubbling reactor is maintained in the desired range.

When flue gas and chlorine dioxide in the bubbling reactor react with each other, a small amount of chlorine dioxide can be produced by side reactions. In the present invention, this chlorine dioxide produced by side reactions is discharged outside the reactor such that it is absorbed into a potassium iodide solution within a chlorine dioxide absorber 50. The potassium solution used for this purpose may be 2% potassium iodide solution buffered with carbonate.

Gas produced by the reaction of flue gas with chlorine dioxide in the bubbling reactor is discharged outside the reactor, and the discharged gas can be analyzed using a gas analyzer 90. In this regard, the gas analyzer may be an ion chromatograph (IC) or an automatic titrator (Metrohm, Swiss).

Meanwhile, before flue gas is supplied into the reaction solution within the bubbling reactor, the concentration of $NO_x$ in the flue gas can be analyzed with a gas analyzer 80 after the removal of moisture, and the $O_2$ concentration within the bubbling reactor can be analyzed with a dissolved oxygen (DO) meter 60.

The chlorine dioxide produced by the reaction of chlorate with a reducing agent in the $ClO_2$ generator 30 can be continuously injected into the reaction solution within the bubbling reactor 10 at a suitable flow rate of 0.5-1.0 ml/min with 2M concentrated NaCl using an injection pump (Mettler Toledo GmbH, Swiss).

The bubbling reactor 10 is filled with a mixed solution of relatively concentrated (12N) sulfuric acid and 0.4M $NaClO_3$ and is continuously stirred using a mechanical stirrer.

The temperature of the reaction solution within the bubbling reactor can be maintained at 45° C. by means of a thermostat (T).

Meanwhile, data, such as the components of flue gas before and after introduction into the bubbling reactor, and a change in pH caused by the reaction of flue gas with chlorine dioxide in the solution within the bubbling reactor, can be stored in real time by the data collector 40.

In order to prevent the photolysis of $ClO_2$, the surface of the bubbling reactor can be covered with a light blocker. An example of the light blocker may be aluminum foil.

The chlorine dioxide produced in the chlorine dioxide generator was introduced into the bubbling reactor at a flow rate of 2 liters/min by a bubble generator using nitrogen as carrier gas.

Figure 2:
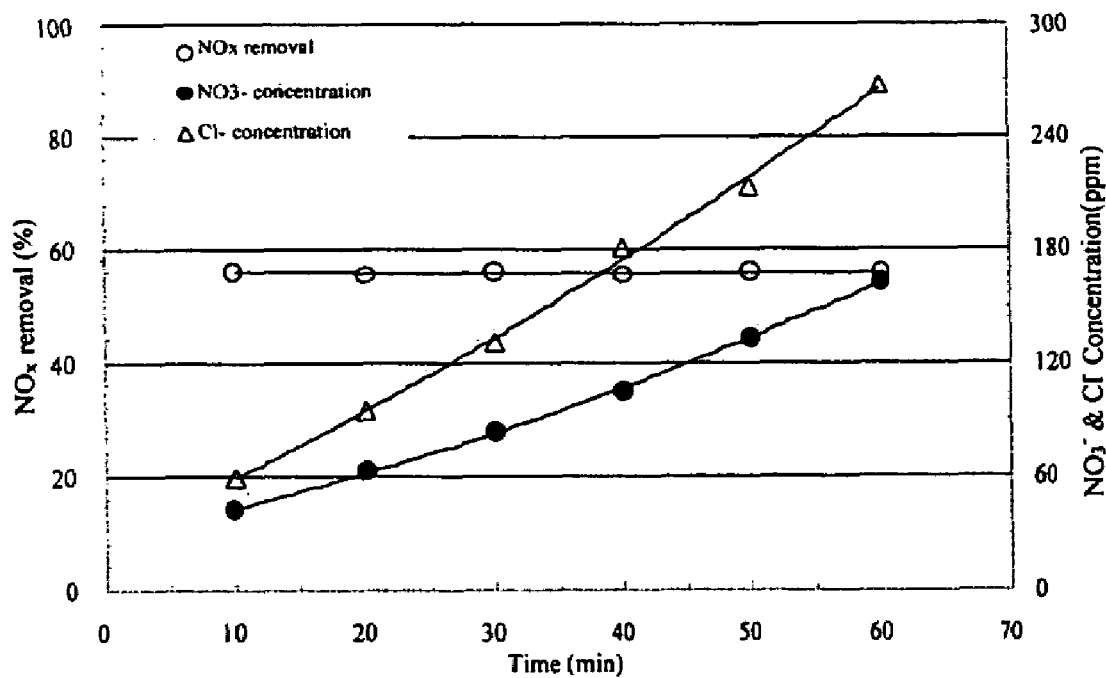
FIG. 2 is a graphic diagram showing $NO_x$ removal efficiency and $NO_3^-$ and $Cl^-$ concentrations as a function of the time taken for the passage of chlorine dioxide ($ClO_2$) into a reaction solution.

The flue gas from which sulfur dioxide has been removed as described was measured for the removal efficiency of $NO_x$ as a function of the supply time of chlorine dioxide, and changes in the concentrations of ions, such as chlorine ion and nitrate ion. The measurement results are shown in FIG. 2.

In the measurement, the concentration of nitrogen oxides was 500 ppm. Also, the measurement was conducted for a period ranging from 10 minutes to 60 minutes after the supply of chlorine dioxide into the reactor.

EXAMPLE 2

In Example 2, a system as shown in FIG. 1 was used to simultaneously remove sulfur dioxide and nitrogen dioxides from flue gas.

The flue gas contained the following components: 350 ppm of nitrogen oxide (NO), a nitrogen oxide; 500 ppm of sulfur dioxide ($SO_2$); 5% oxygen; and the balance of nitrogen.

Such flue gas was supplied into the reaction solution within the reactor while forming bubbles.

The reaction temperature within the reactor was maintained at 45° C., and the pH of the reaction solution was maintained at 3-4, and preferably about 3.5.

Figure 3:
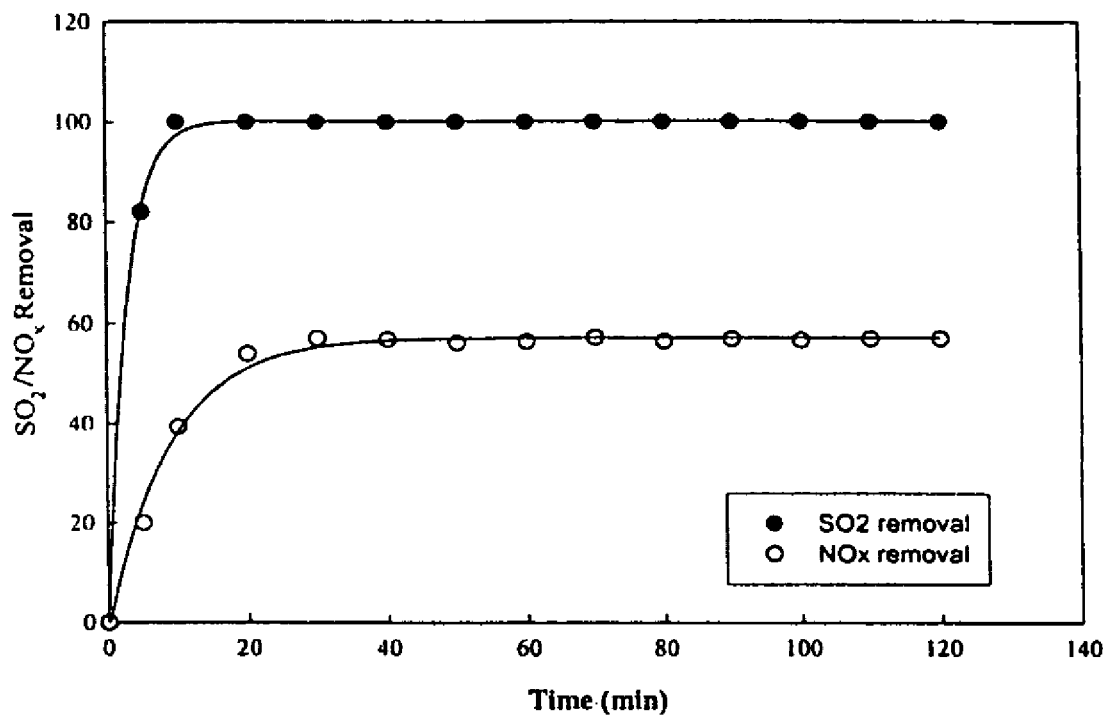
FIG. 3 is a graphic diagram showing the removal rates of sulfur dioxide and nitrogen oxides by chlorine dioxide at a pH of 3.5.

FIG. 3 shows the removal efficiency of $SO_2$ and $NO_x$. As can be seen in FIG. 3, the removal rate of $SO_2$ reached about 100% almost instantly, and after a while, the oxidation of NO also reached about 100%. Also, the maximum removal rate of $NO_x$ was about 60%.

EXAMPLE 3

A change in the removal efficiency of $NO_x$ as a function of the input concentration of nitrogen oxide in flue gas was examined.

Figure 4:
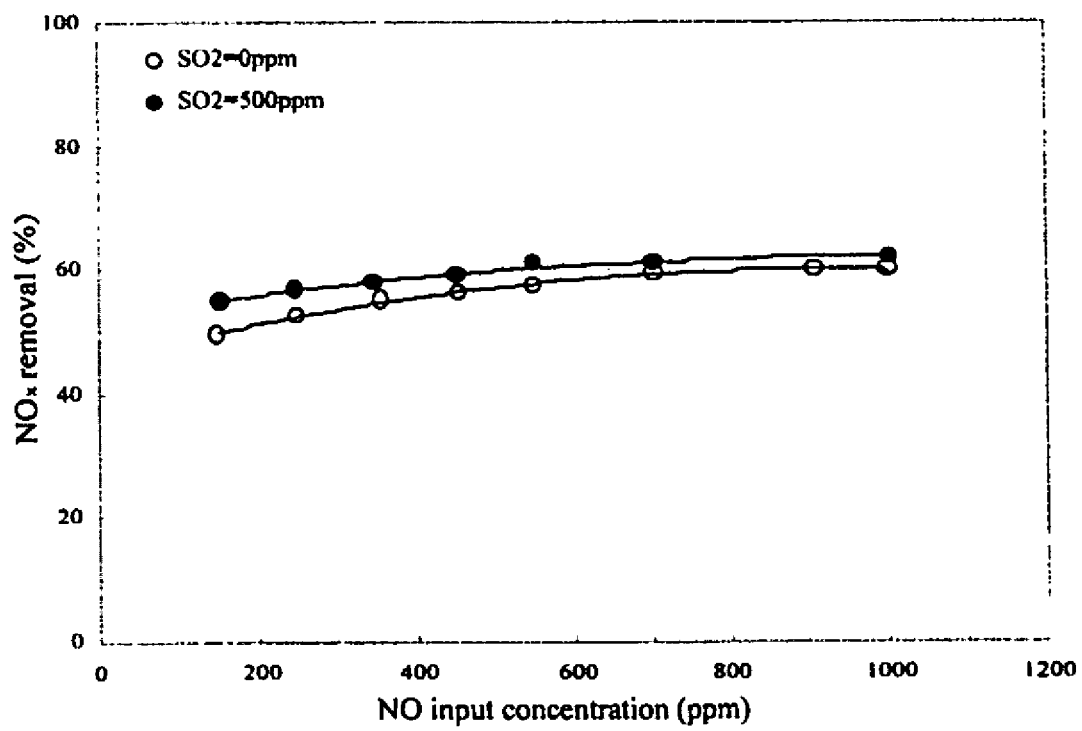
FIG. 4 is a graphic diagram showing the effects of the presence or absence of sulfur dioxide and the input concentration of nitrogen oxide (NO) on the removal efficiency of nitrogen oxides.

The flue gas was allowed to contain 150-1,000 ppm of NO, 5% oxygen and the balance of nitrogen. The flue gas was introduced into the reactor at a flow rate of 45 liters/min, and the same method as in Example 1 was used to remove nitrogen oxides from the flue gas. The results are shown in FIG. 4.

EXAMPLE 4

A change in the removal efficiency of nitrogen oxides as a function of the input concentration of sulfur oxide in flue gas was examined.

Figure 5:
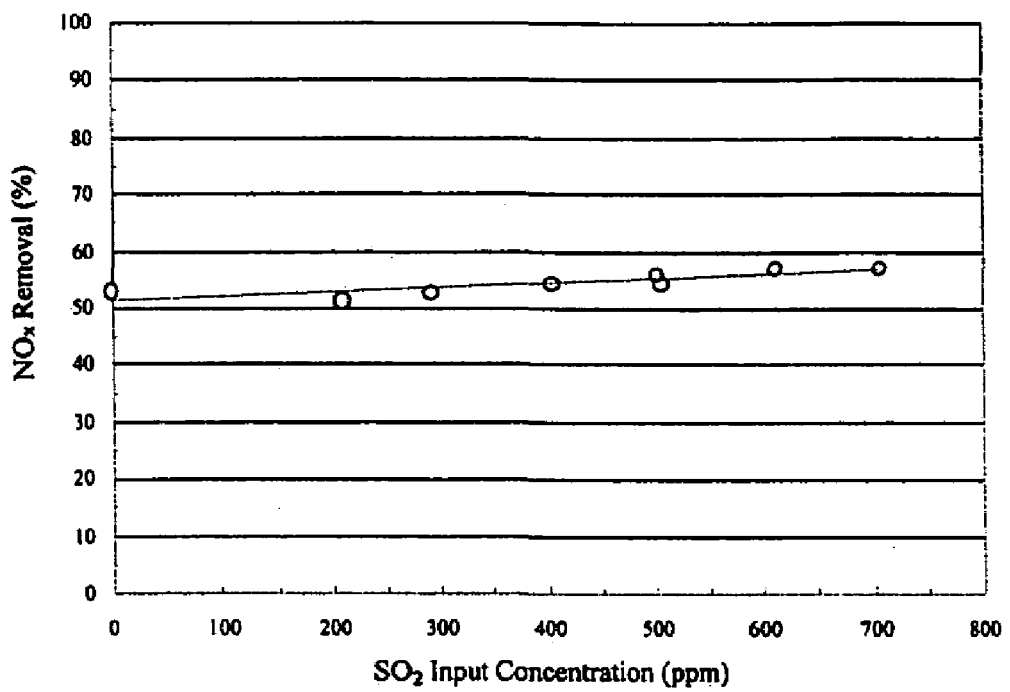
FIG. 5 is a graphic diagram showing the effect of the input concentration of sulfur dioxide on the removal efficiency of nitrogen oxides ($NO_x$) when the input concentration of nitrogen oxide into a reaction solution is constant.

The removal efficiency of $NO_x$ as a function of the input concentration of sulfur oxide in flue gas was measured in the same manner as in Example 1 except that the flue gas was allowed to contain 200-700 ppm of $SO_2$ and 350 ppm of NO, 5% oxygen and the balance of nitrogen. The measurement results are shown in FIG. 5.

EXAMPLE 5

A change in the removal efficiency of $NO_x$ as a function of the pH of the reaction solution within the reactor was examined.

The removal efficiency of nitrogen oxides from flue gas was measured using the same method and system as in Example 1 except that the flue gas supplied into the reactor contained 500 ppm of NO, 5% oxygen and the balance of nitrogen, and the pH of the reaction solution was changed from 3 to 11. The results are shown in FIG. 6.

Figure 6:
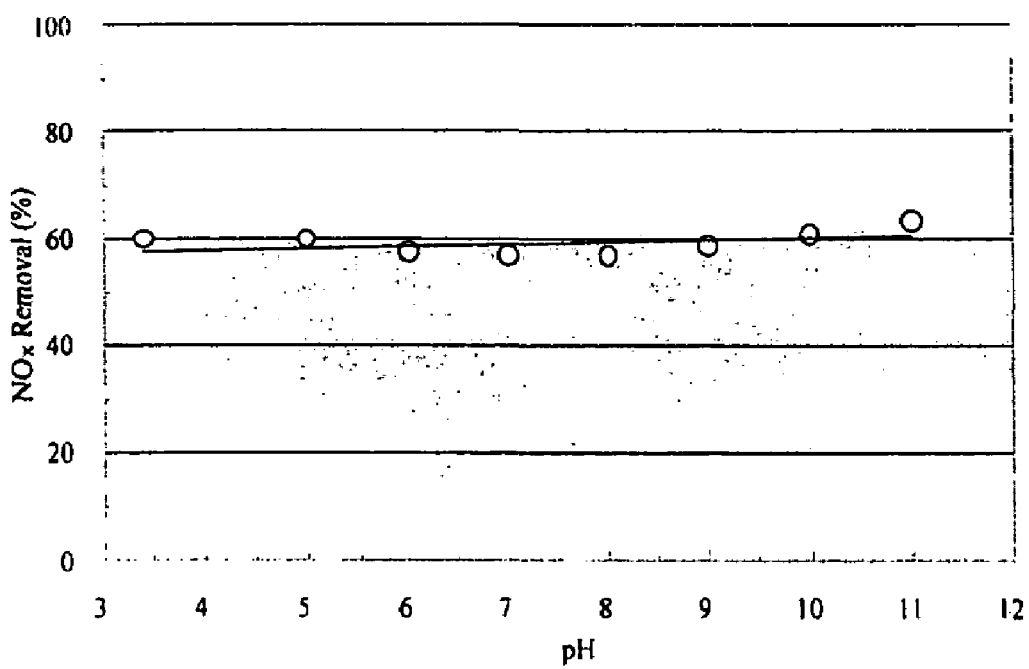
FIG. 6 is a graphic diagram showing the effect of pH on the removal efficiency of $NO_x$ when the input concentration of nitrogen oxide into a reaction solution is constant.

As can be seen in FIG. 6, the supply of sufficient $ClO_2$ provides the reproducible effect of removing $NO_x$ in a pH range of 3-11.

As can be seen from the foregoing, according to the present invention, $SO_2$ and $NO_x$ in flue gas can be simultaneously removed from the flue gas by the supply of $ClO_2$ into the reaction solution within a single reactor.

Also, according to the present invention, the optimum conditions for the efficient simultaneous removal of $SO_x$ and $NO_x$ can be established, and a process can be provided which is easy to handle such that it can be widely used.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A process for removing sulfur dioxide and nitrogen oxides from flue gas, comprising reacting chlorine dioxide with the flue gas in an alkaline reaction solution so as to simultaneously remove sulfur dioxide and nitrogen oxides from the flue gas.

2. The process of claim 1, wherein the chlorine dioxide is obtained by reducing chlorate with a reducing agent.

3. The process of claim 1, wherein the concentration of the chlorine dioxide is adjusted by the supply rate of a reducing agent.

4. The process of claim 1, wherein the chlorine dioxide is introduced into the reaction solution by a carrier gas selected from the group consisting of air, nitrogen and flue gas.

5. The process of claim 1, wherein the chlorine dioxide is supplied into the reaction solution within a closed reactor having a total volume of 2.5 liters by a carrier gas having a flow rate of 2-10 liters/min per liter of the reaction solution.

6. The process of claim 1, wherein the reaction between the chlorine dioxide and the flue gas is carried out at a temperature of 20-60° C.

7. The process of claim 1, wherein the pH of the reaction solution is maintained in a range of 7-11.

8. The process of claim 1, wherein the flue gas contains 4-10% of oxygen.

9. The process of claim 1, wherein the concentration of the sulfur dioxide in the flue gas is 200-700 ppm.

10. The process of claim 1, wherein the concentration of nitrogen oxides in the flue gas is 150-1,000 ppm.

11. The process of claim 2, wherein the reducing agent is at least one selected from the group consisting of sulfur dioxide ($SO_2$), sodium chloride (NaCl), hydrochloric acid (HCl), methanol ($CH_3OH$), and hydrogen peroxide ($H_2O_2$).

12. The process of claim 7, wherein alkali metal hydroxide or alkaline metal hydroxide is added to the reaction solution in order to maintain the pH of the reaction solution in a range of 7-11.

13. The process of claim 2, wherein the chlorate comprises sodium chlorate.

14. A process for removing sulfur dioxide and nitrogen oxides from flue gas, comprising reacting chlorine dioxide with the flue gas in a reaction solution so as to simultaneously remove sulfur dioxide and nitrogen oxides from the flue gas, wherein the reaction solution has a pH of 3.5-6.

15. The process of claim 14, wherein the reaction solution has a pH of 3.5-5.

16. A process tor removing sulfur dioxide and nitrogen oxides from flue gas, comprising:
reacting chlorine dioxide with flue gas in a reaction solution so as to simultaneously remove sulfur dioxide and nitrogen oxides from the flue gas,
wherein the chlorine dioxide is obtained by reducing chlorate with a reducing agent, the reducing agent being at least one selected from the group consisting of sulfur dioxide ($SO_2$), sodium chloride (NaCl) and hydrochloric acid (HCl), methanol ($CH_3OH$), and hydrogen peroxide ($H_2O_2$); the chlorine dioxide is supplied into the reaction solution within a closed reactor having a total volume of 2.5 liters by a carrier gas having a flow rate of 2-10 liters/min per liter of the reaction solution; the reaction between the chlorine dioxide and the flue gas is carried out at a temperature of 20-60° C.; and the pH of the reaction solution is maintained in a range of 3.5-5.

* * * * *

UNITED STATES PATENT AND TRADEMARK OFFICE
CERTIFICATE OF CORRECTION

| | | |
|---|---|---|
| PATENT NO. | : 7,455,820 B2 | Page 1 of 1 |
| APPLICATION NO. | : 11/323298 | |
| DATED | : November 25, 2008 | |
| INVENTOR(S) | : Lee et al. | |

It is certified that error appears in the above-identified patent and that said Letters Patent is hereby corrected as shown below:

Column 9
Line 3 claim 16, delete "tor" insert -- for --.

Signed and Sealed this

Seventeenth Day of February, 2009

JOHN DOLL
*Acting Director of the United States Patent and Trademark Office*